US012456051B2

(12) United States Patent
Ngan et al.

(10) Patent No.: US 12,456,051 B2
(45) Date of Patent: Oct. 28, 2025

(54) KERNEL TRANSFER

(71) Applicant: Fujitsu Limited, Kawasaki (JP)

(72) Inventors: Kwun Ho Ngan, Cambridge (GB); Artur Garcez, Morden (GB); Joseph Townsend, High Wycombe (GB)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 18/081,719

(22) Filed: Dec. 15, 2022

(65) Prior Publication Data
US 2023/0281441 A1 Sep. 7, 2023

(30) Foreign Application Priority Data

Jan. 28, 2022 (EP) .................................... 22153860

(51) Int. Cl.
*G06N 3/08* (2023.01)
*G06N 3/045* (2023.01)
(Continued)

(52) U.S. Cl.
CPC ............... *G06N 3/08* (2013.01); *G06N 3/045* (2023.01); *G06V 10/762* (2022.01); *G06V 10/82* (2022.01)

(58) Field of Classification Search
CPC ....... G06F 18/214; G06F 18/28; G06N 20/10; G06N 3/045; G06N 3/0464; G06N 3/08;
(Continued)

(56) References Cited

U.S. PATENT DOCUMENTS

2008/0239076 A1* 10/2008 Luo ..................... G06V 20/584
348/148
2010/0214936 A1* 8/2010 Ito ......................... G06N 3/045
370/252
(Continued)

FOREIGN PATENT DOCUMENTS

CA 3038031 A1 * 4/2018 ............. G06V 10/82
CN 106897734 A 6/2017
(Continued)

OTHER PUBLICATIONS

Na Liu et al.,"Exploiting Convolutional Neural Networks With Deeply Local Description for Remote Sensing Image Classification," Mar. 16, 2018,IEEEAccess,vol. 6,2018,pp. 11215-11224.*
(Continued)

Primary Examiner — Omar S Ismail
(74) Attorney, Agent, or Firm — XSENSUS LLP

(57) ABSTRACT

A computer-implemented method comprising: obtaining an output from each of a plurality of kernels in an extraction layer of a first trained convolutional neural network, wherein the first convolutional neural network is configured to identify one or more features in an image; aggregating the outputs corresponding to at least some input samples of a first domain to generate an aggregate map corresponding to that kernel; resizing the aggregate maps to a lower resolution to generate a plurality of region maps corresponding to the aggregate maps, respectively; clustering the region maps to generate clusters of region maps, each cluster comprising region maps having similar regions; and training, using input samples of a second domain, a second convolutional neural network with a kernel weight of at least one of the kernels which corresponds to at least one of the image regions of at least one of the clusters.

20 Claims, 9 Drawing Sheets

(51) Int. Cl.
*G06V 10/762* (2022.01)
*G06V 10/82* (2022.01)

(58) Field of Classification Search
CPC .......... G06N 3/082; G06N 3/096; G06N 5/01;
G06N 5/025; G06N 5/045; G06V 10/762;
G06V 10/82; G06V 20/582
See application file for complete search history.

(56) References Cited

U.S. PATENT DOCUMENTS

| | | | | |
|---|---|---|---|---|
| 2010/0223219 | A1* | 9/2010 | Kato | G06N 3/08 711/E12.001 |
| 2017/0262962 | A1* | 9/2017 | Rad | H04N 1/6008 |
| 2017/0308734 | A1* | 10/2017 | Chalom | G06V 40/193 |
| 2018/0129893 | A1* | 5/2018 | Son | G06N 3/04 |
| 2018/0137642 | A1* | 5/2018 | Malisiewicz | G06N 3/045 |
| 2019/0138898 | A1* | 5/2019 | Song | G06N 3/045 |
| 2019/0220746 | A1* | 7/2019 | Liu | G06N 3/084 |
| 2019/0266387 | A1* | 8/2019 | Sun | G06V 40/171 |
| 2019/0286980 | A1* | 9/2019 | Backhus | G06N 20/10 |
| 2020/0082249 | A1* | 3/2020 | Hua | G06N 3/045 |
| 2020/0145642 | A1* | 5/2020 | Yu | G06T 5/50 |
| 2020/0202200 | A1* | 6/2020 | Son | G06F 9/30018 |
| 2022/0375602 | A1* | 11/2022 | Jaber | G16H 30/40 |

FOREIGN PATENT DOCUMENTS

| | | |
|---|---|---|
| CN | 108846445 A | 11/2018 |
| CN | 111709449 A | 9/2020 |
| CN | 112204582 A | 1/2021 |
| CN | 112270405 A | 1/2021 |
| CN | 112819093 A | 5/2021 |
| EP | 3291146 A1 | 3/2018 |
| EP | 3509017 A1 | 7/2019 |
| WO | 2021/012526 A1 | 1/2021 |

OTHER PUBLICATIONS

Chen Ding et al.,"Convolutional Neural Networks Based Hyperspectral Image Classification Method with Adaptive Kernels," Jun. 16, 2017, remote sensing, 2017, 9, 618,pp. 1-13.*

Hoo-Chang Shin et al., "Deep Convolutional Neural Networks for Computer-Aided Detection: CNN Architectures,Dataset Characteristics and Transfer Learning," Apr. 29, 2016, IEEE Transactions on Medical Imaging, vol. 35, No. 5, May 2016, pp. 1285-1296.*

Xin He et al.,"Heterogeneous Transfer Learning for Hyperspectral Image Classification Based on Convolutional Neural Network," Apr. 22, 2020, IEEE Transactions on Geoscience and Remote Sensing, vol. 58, No. 5, May 2020.pp. 3246-3261.*

Maxime Oquab et al.,"Learning and Transferring Mid-Level Image Representations using Convolutional Neural Networks," Jun. 2014,Proceedings of the IEEE Conference on Computer Vision and Pattern Recognition (CVPR), 2014, pp. 1-4.*

A.S. d'Avila Garcez et al.,"Symbolic knowledge extraction from trained neural networks: A sound approach," Jan. 2001,Artificial Intelligence 125 (2001), pp. 155-175.*

Zhongling Huang et al.,"Transfer Learning with Deep Convolutional Neural Network for SAR Target Classification with Limited Labeled Data," Aug. 31, 2017,Remote Sens. 2017, 9(9), 907,pp. 1-15.*

Claudio Persello,"Kernel-Based Domain-Invariant Feature Selection in Hyperspectral Images for Transfer Learning," Dec. 17, 2015,IEEE Transactions on Geoscience and Remote Sensing,vol. 54,Issue:5,May 2016,pp. 2615-2621.*

Alessandro Aimar et al.,"NullHop: A Flexible Convolutional Neural Network Accelerator Based on Sparse Representations of Feature Maps," Jul. 26, 2018, IEEE Transactions on Neural Networks and Learning Systems ,vol. 30, Issue: 3, Mar. 2019, pp. 644-651.*

Annegreet Van Opbroek,"Transfer Learning for Image Segmentation by Combining Image Weighting and Kernel Learning, " Jul. 25, 2018, IEEE Transactions on Medical Imaging,vol. 38,Issue: 1, Jan. 2019,pp. 213-220.*

Benedikt Wagner et al.,"Neural-Symbolic Integration for Interactive Learning and Conceptual Grounding," Jan. 17, 2022, Artificial Intelligence,arXiv:2112.11805,pp. 1-4.*

Yosinski et al., "How transferable are features in deep neural networks?", Nov. 6, 2014, pp. 1-9.

Wagner et al., "Neural-Symbolic Integration for Interactive Learning and Conceptual Grounding", ARXIV ORGr Cornell University Library, arXiv:2112.11805v2, Jan. 17, 2022, pp. 1-6.

Garcez et al., "Symbolic knowledge extraction from trained neural networks: A sound approach", Artificial Intelligence, vol. 125, No. 1-2, 2001, pp. 155-207.

Craven et al., "Extracting Tree-Structured Representations of Trained Networks", In Advances in Neural Information Processing Systems, 1996, pp. 24-30.

Townsend et al., "ERIC: Extracting Relations Inferred From Convolutions", 15th Asian Conference on Computer Vision, Kyoto, Japan, Revised Selected Papers, Part III, vol. 12624 of Lecture Notes in Computer Science, Springer, Nov. 30-Dec. 4, 2020, pp. 206-222.

Odense, "Layerwise Symbolic Knowledge Extraction From Deep Neural Networks", City, University of London Institutional Repository, arXiv preprint arXiv:2003.09000, Nov. 2019, pp. 1-191.

Quinlan, "C4.5: Programs for machine learning," The Morgan Kaufmann Series in Machine Learning, Morgan Kaufmann, 1993, pp. 1-312.

Extended European Search Report mailed on Aug. 16, 2022, received for EP Application 22153860.6, 10 pages.

* cited by examiner

KERNEL TRANSFER

CROSS-REFERENCE TO RELATED APPLICATION

This application claims priority from EP 22153860.6, filed on Jan. 28, 2022, the contents of which are incorporated by reference herein in its entirety.

The present invention relates to kernel transfer, and in particular to a computer-implemented method, a computer program, and an information processing apparatus.

Transfer learning is a process in which weights from a network trained for one task can be reused as a starting point for training a network on a similar task. This becomes more difficult as the two tasks show greater differences, for example when the images in the dataset for one task are of a different quality to the images in the dataset for the other task, or when the images in one dataset use a different colour palette to the images in the other dataset, etc.

Furthermore, it may be that not all the weights for all features learned by the network are to be transferred and the user may require some means of inspecting them in order to transfer only the relevant weights. Even if the user had some means of inspecting the weights and selecting which weights to transfer, the selection process has the potential to be laborious if each kernel must be selected manually.

Convolutional neural networks (CNNs) are composed of kernels which act as feature detectors. Literature in explainable AI (Artificial Intelligence) proposes that kernels in convolutional neural networks can be labelled in order to support interpretability (the degree to which a human can consistently predict the model's/network's result; the higher the interpretability of a CNN, the easier it is for someone to comprehend why certain decisions or predictions have been made) especially for methods that extract rules which describe, in terms of those labelled kernels, why the CNN behaves as it does. Kernel labels may also support a user in deciding which kernels they wish to transfer to a second task. However, methods of assigning labels to kernels in order to improve the interpretability of those rules is difficult to achieve automatically and laborious to perform manually.

Automatic transfer provides a way of transferring kernels from a first network to a second without human interaction, but the kernels in the first network still need labelling. Human involvement in the process of transferring kernels from a first network to a second may be beneficial in some circumstances, especially those that may be safety critical such as self-driving cars or medical applications. Completely automatic transfer does not allow the user to have any input in what is transferred, but such user input/human interaction may be necessary if the user knows that some concepts will not be useful in the domain of the second network and so some kernels should not be transferred to the second network. To modify the approach so that the user chooses which kernels may be transferred and which may not would be trivial, but laborious for the user when the network has a large number of kernels.

As mentioned above, convolutional neural networks (CNNs) are composed of kernels which act as feature detectors and it may be that a user wishes to transfer the weights of some kernels but not others, because it may be that some features are common to both source and target domains but other features are unique to the source domain.

Various methods have been proposed for translating convolutional neural networks into more interpretable logic programs or other symbolic representations, not least so that they may enable such accountability. In particular, convolutional kernels can be mapped to individual symbols. In logic programs these symbols are called 'atoms', which when assigned a polarity are referred to as literals; given atom A, positive and negative literals are denoted 'A' and '¬A' respectively (A is true and A is not true, respectively). An example of a rule expressed in the form of literals is: A ∧¬B ∧C→D (if kernel A is active, kernel B is inactive, and kernel C is active, then assign class D).

Such rule extraction algorithms generalise to arbitrary neural networks. Outputs of neurons may be quantised (usually to binary values via thresholding) and rules derived that describe the activation of one layer of target neurons of dimension (n,C) in terms of another set of input neurons of dimension (n,K), where n is the number of samples, K is the number of input neurons and C the number of output neurons. For traditional artificial neural networks, extraction algorithms include CILP (A. S. d'Avila Garcez, K. Broda, and D. M. Gabbay, "Symbolic knowledge extraction from trained neural networks: A sound approach," Artificial Intelligence, vol. 125, no. 1-2, pp. 155-207, 2001), TREPAN (M. Craven and J. W. Shavlik, "Extracting tree-structured representations of trained networks," in Advances in neural information processing systems, 1996, pp. 24-30) and others. Decision tree methods such as C4.5 (J. R. Quinlan, "C4.5: Programming for machine learning," The Morgan Kaufmann Series in Machine Learning, San Mateo, CA: Morgan Kaufmann, vol. 38, p. 48, 1993) may also be applied to the quantised input/output pairs.

In order to apply these rule extraction methods to convolutional neural networks, convolutional kernels are treated as individual neurons by mapping kernel activation maps to individual values so that they may be quantised through binary thresholding. Methods that apply this approach include ERIC (Extracting Relations Inferred from Convolutions, described in "ERIC: extracting relations inferred from convolutions", J. Townsend, T. Kasioumis, H. Inakoshi, 15th Asian Conference on Computer Vision, Kyoto, Japan, Revised Selected Papers, Part III, volume 12624 of Lecture Notes in Computer Science, Springer, November 30—Dec. 4, 2020, pp. 206-222) and the method described in Odense, S. and Garcez, A. D. 2020 Layerwise Knowledge Extraction from Deep Convolutional Networks, arXiv preprint arXiv:2003.09000. The latter constructs rules according to a heuristic search whereas ERIC by default constructs rules according to the C4.5 algorithm but may use any method which generates rules for input/output pairs of binary matrices of dimensions (n,K), (n,C) respectively.

Assigning labels to atoms/symbols (and by extension the kernels) remains an outstanding challenge. Some attempts have been made to automatically assign labels to kernels or assign them in a semi-supervised way, for example by passing each kernel's output into a separate classifier. However, the problem of kernel labelling remains largely unsolved. The approach of applying a second classifier to each kernel output is computationally expensive and other approaches require some human interaction.

In light of the above, a kernel transfer method is desired.

According to an embodiment of a first aspect there is disclosed herein a computer-implemented method comprising: for each of a plurality of input samples of (associated with) a first domain, obtaining an output from each of a plurality of kernels in an extraction layer of a first trained (convolutional) neural network, wherein the first (convolutional) neural network is configured to identify one or more features in an image; for each of at least some of the kernels, aggregating the outputs corresponding to at least some of the input samples to generate an aggregate map corresponding to that/the kernel; resizing the aggregate maps to a lower resolution to generate a plurality of region maps corresponding to the aggregate maps, respectively (so that a single pixel in each region map corresponds to a fixed spatial region occupied by multiple pixels in the corresponding aggregate map) (each region map comprising at least one region corresponding to features identified in the input samples by the corresponding kernel); clustering the region maps to generate clusters of region maps, each cluster comprising region maps having similar regions (similar identified visual features); and training, using input samples of (associated with) a second domain, a second (convolutional) neural network with a kernel weight of at least one of the kernels which corresponds to at least one of the image regions (respectively) of at least one of the clusters.

Embodiments may achieve the transfer of the knowledge a CNN learns about specific regions of an image from a source domain to a target domain. Embodiments may also preserve labels that support the explainability of the CNN assigned to kernels which contain this knowledge. Embodiments may allow the transfer to be carried out in an interactive way.

Embodiments may provide a solution for applications in which certain regions in the input samples (images) are fixed (spatially) across the input samples (images) in the source domain and target domain datasets, even whilst there may be variation within those regions. For example, when a CNN is used in a self-driving car, the sky will always appear at the top of an image (as an input sample) captured by the camera used by the self-driving car, whilst the sky may be dark in some images, but light in others, etc. For example, when a CNN is used in a medical application involving frontal chest X-rays, lungs will always appear either side of the spine which itself will be placed roughly in the centre, in X-ray images (as input samples), whilst the condition of both lungs and spine may vary between patients.

This regional invariance is detected by clustering kernels into clusters comprising kernels that recognise features in those invariant regions. Entire clusters may then be selected for label or weight transfer to another network, as opposed to the cumbersome task of selecting kernels individually. Furthermore, to account for variations both within a dataset and between the datasets, kernels may be clustered according to low-resolution, spatially-invariant region maps that may be generated by down-sampling an aggregation map of a kernel's outputs to the lower resolution or even detected using feature detection methods such as SURF or SIFT, described below.

The invention has many applications including automotive and medical applications. In automotive applications, the invention may transfer trained, explainable networks between different driving environments (i.e. transfer kernels/kernel weights between networks used in different driving environments), for example from urban to countryside, or from one country to another. In medical applications, the invention may transfer trained, explainable networks between different (medical) tasks, e.g. different disease detection/body part analysis tasks (i.e. transfer kernels/kernel weights between networks used in different disease detecting tasks). For example, kernel clusters trained to detect pleural effusion in the lungs may be primed for detecting signs of COVID-19 by transferring kernels/kernel weights. In any application, the invention supports interpretability and therefore accountability, supporting the goal of developing Trusted AI and keeping the human in the loop in preparing CNNs to perform safety-critical tasks. There is a particular need for interpretability in medical applications of machine learning.

The first and second (convolutional) neural networks may be configured to classify images (using image processing).

Training the second (convolutional) neural network may comprise training the second (convolutional) neural network to classify images (the input samples of the second domain) (using image processing).

The first domain may be referred to as a source domain and the second domain as a target domain.

The input samples may be referred to as input data. The input samples may comprise images.

Each output of a (said) kernel corresponding to/for an input sample may be referred to as a feature map or an activation map or an activation matrix.

A feature map of a said kernel corresponding to/for an input sample may depict active regions for the kernel with respect to the input sample.

The input samples of the first domain may (each) comprise at least one spatially invariant feature/region. The at least one spatially invariant feature/region may be common to some of or most of or all of the input samples of the first domain.

The input samples of the second domain may (each) comprise at least one spatially invariant feature/region. The at least one spatially invariant feature/region may be common to some of or most of or all of the input samples of the second domain.

The input samples of the first and second domains may (each) comprise at least one spatially invariant feature/region. The at least one spatially invariant feature/region may be common to some of or most of or all of the input samples of the first and second domains.

The computer-implemented method may comprise, in a step preceding training the second (convolutional) neural network, selecting the at least one cluster/any cluster comprising a threshold number or more of image regions, and selecting therefrom the at least one kernel whose kernel weight is to be used in the second (convolutional) neural network.

The training of the second (convolutional) neural network may comprise training the second (convolutional) neural network with kernel weights of a plurality of the kernels which correspond to a plurality of (or all of) the image regions (respectively) of at least one of the clusters.

The training of the second (convolutional) neural network may comprise training the second (convolutional) neural network with kernel weights of the kernels corresponding to the image regions (respectively) of the at least one of the clusters.

The computer-implemented method may comprise, in a step preceding training the second (convolutional) neural network, selecting the at least one/any cluster comprising a threshold number or more of image regions.

The selection of the at least one cluster may be based on user input.

The computer-implemented method may comprise, in a step (directly) preceding the aggregation of the outputs, the resizing of the aggregate maps, or the clustering of the region maps: extracting rules associated with the kernels in the first (convolutional) neural network.

The computer-implemented method may comprise, in a step (directly) preceding the aggregation of the outputs, the resizing of the aggregate maps, or the clustering of the region maps: extracting a symbolic approximation of the first (convolutional) neural network's behaviour.

The symbolic approximation may be a logic program or a decision tree.

At least some of the kernels of the first (convolutional) neural network may be represented as atoms in the symbolic approximation.

Any steps subsequent to the extraction of the symbolic approximation may be limited to the kernels which are represented by rules/atoms in the symbolic approximation.

The symbolic approximation may be extracted using a rule extraction method such as ERIC, Extracting Relations Inferred from Convolutions.

Extracting the symbolic approximation may comprise: mapping the kernels of the first convolutional neural network to individual values (to treat the kernels as individual neurons); optionally quantising the individual values to binary values using binary thresholding; and further optionally deriving rules that describe the activation of one layer of target kernels or neurons of dimension n,C in terms of another set of input kernels of dimension n,K, where n is the number of samples, K is the number of input kernels and C is the number of output kernels or neurons.

A kernel may comprise a plurality of neurons (trained to identify a visual feature in the input samples).

Any steps subsequent to the extraction of the rules may be limited to kernels in the first (convolutional) neural network which are associated with rules.

The aggregation of outputs (of a said or of each said kernel) may comprise aggregating outputs corresponding to: a random selection of input samples; or a (predetermined) number of input samples for which an activation score $a_{k,i}$ is highest; or the input samples for which an activation score $a_{k,i}$ is above a threshold activation score, wherein $a_{k,i}$ is the activation score of kernel k for input sample i.

The activation score $a_{k,i}$ may be for use in a function which maps the output of a kernel for an input sample to a single value, such as the L1 norm, the L2 norm, or max pooling.

The activation score $a_{k,i}$ may be a measure of how much/whether/to what extent the kernel k is activated by the input sample i.

The activation score $a_{k,i}$ may be a measure of whether and/or to what extent the input sample i includes a feature which the kernel k is configured to search for.

The aggregation of outputs may comprise aggregating the outputs corresponding to at least some of the input samples for a (predetermined) number of kernels that activate most frequently with respect to the rule extraction method.

The aggregation of outputs may comprise aggregating the outputs corresponding to at least some of the input samples for a (predetermined) number of kernels with the highest average value of $a_k$, wherein $a_k$ is a vector of activation scores corresponding to the at least some input samples for the kernel.

The aggregation of outputs (of each or of a said kernel) may comprise computing each element of the aggregate map as a normalized sum of a corresponding element of each of the outputs (of the kernel).

The aggregation of outputs (of a said kernel) may comprise computing each element of the aggregate map as a normalized sum of corresponding elements in the outputs/feature maps (of the kernel).

The aggregation of outputs (of a said or of each kernel) may comprise computing each element of the aggregate map as a normalized sum of a corresponding element in each feature map/output (of the kernel).

The aggregation of outputs (of a said or of each kernel) may comprise computing each element of the aggregate map as a normalized sum of an element in each feature map/output (of the kernel) at a location within the feature map concerned corresponding to the location within the aggregate map of the element.

The resizing of the aggregate maps may comprise performing a SIFT, Scale-Invariant Feature Transform, operation or a SURF, Speeded Up Robust Features, operation on the aggregate maps and then resizing the aggregate maps to the lower resolution to generate the plurality of region maps.

The clustering of the region maps may be based on flattened representations of the region maps.

The method may comprise obtaining the flattened representations by reshaping each region map into a (one-dimensional) vector.

The clustering of the region maps may comprise performing the clustering using a k-means clustering algorithm.

The computer-implemented method may comprise, in a step (directly) following the clustering of the region maps, labelling at least some of the kernels.

The computer-implemented method may comprise, in a step (directly) following the clustering of the region maps, labelling a plurality of the kernels by labelling at least one cluster.

Training the second (convolutional) neural network may comprise using the labels of the kernels corresponding to image regions (respectively) of the at least one cluster.

The labelling may comprise detecting and classifying at least one region in at least one region map of a said cluster using image processing, and assigning a label to that cluster based on the classification.

The labelling may comprise labelling a cluster based on user input.

The labelling may comprise a user assigning a label to a cluster.

Training the second (convolutional) neural network may comprise: freezing kernel weights used in the second (convolutional) neural network and corresponding to the image regions of at least one cluster; and/or allowing training of the second (convolutional) neural network to adjust kernel weights used in the second (convolutional) neural network and corresponding to the image regions of at least one (other) cluster.

The computer-implemented method may comprise: selecting at least one cluster whose weights are (or at least one kernel whose weight is) to be frozen in (the training of) the second (convolutional) neural network; and/or selecting at least one cluster whose weights are (or at least one kernel whose weight is) to be adjusted by training the second (convolutional) neural network.

The selection may be based on user input.

The computer-implemented method may comprise the user: selecting at least one cluster whose weights are (or at least one kernel whose weight is) to be frozen in (the training of) the second (convolutional) neural network; and/or selecting at least one cluster whose weights are (or at least one kernel whose weight is) to be adjusted by training the second (convolutional) neural network.

The computer-implemented method may comprise the user making their selection using a graphical user interface.

The selection may comprise detecting and classifying (using image processing) at least one region in at least one region map of a said cluster using image processing, and making the selection based on the classification.

The computer-implemented method may further comprise implementing the method using another layer of the first convolutional neural network as another extraction layer and transferring kernel weights from this other layer.

The output of a said kernel corresponding to a said input sample may be represented by the input sample with a feature identified therein.

The output of a (said) kernel corresponding to/for a (said) input sample may comprise a tensor of activations (activation scores) output by that kernel.

The input samples of the first domain may comprise images taken by an on-board camera of at least one vehicle in a first geographical area/location and the input samples of the second domain may comprise images taken by an on-board camera of at least one vehicle in a second geographical area/location.

The input samples of the first and second domains may comprise medical images taken of at least one patient.

The first and second geographical areas may be first and second (different) countries, respectively.

The first and second geographical areas may be first and second (different) environments. The first geographical area may be an urban or countryside location and the second geographical area may be the other of urban and countryside.

The vehicles may be fully or partially self-driving vehicles.

A computer may be configured to use the first (convolutional) neural network to operate (fully or partially operate) at least one vehicle in the first geographical area. A computer may be configured to use the second (convolutional) neural network to operate (fully or partially operate) at least one vehicle in the second geographical area.

The computer-implemented method may comprise using the first (convolutional) neural network to operate (fully or partially operate) at least one vehicle in the first geographical area, and/or using the second (convolutional) neural network to operate (fully or partially operate) at least one vehicle in the second geographical area.

The first (convolutional) neural network may be for use in a first medical task. The second (convolutional) neural network may be for use in a second medical task.

The computer-implemented method may comprise using the first (convolutional) neural network in a first medical task and/or using the second (convolutional) neural network in a second medical task.

The first medical task may comprise detecting a first condition or disease (using image processing on the medical images of the first domain) and the second medical task may comprise detecting a second condition or disease (using image processing on the medical images of the second domain).

The medical images may be or may comprise X-ray images.

The X-ray images may be or may comprise chest X-ray images. The first medical task may comprise detecting plural effusion in lungs and the second medical task may comprise detecting COVID-19.

According to an embodiment of a second aspect there is disclosed herein a computer-implemented method comprising: for each of a plurality of input samples of (associated with) a first domain, obtaining an output from each of a plurality of kernels in an extraction layer of a first (convolutional) neural network, wherein the first (convolutional) neural network is configured to identify one or more features in an image; for each of at least some of the kernels, aggregating the outputs corresponding to at least some of the input samples to generate an aggregate map corresponding to that kernel; resizing the aggregate maps to a lower resolution to generate a plurality of region maps corresponding to the aggregate maps, respectively (so that a single pixel in each region map corresponds to a fixed spatial region occupied by multiple pixels in the corresponding aggregate map) (each region map comprising at least one region corresponding to features identified in the input samples by the corresponding kernel); clustering the region maps to generate clusters of region maps, each cluster comprising region maps having similar regions (similar identified visual features).

According to an embodiment of a third aspect there is disclosed herein a computer program (comprising instructions) which, when run on a computer, causes (cause) the computer to carry out a method comprising: for each of a plurality of input samples of (associated with) a first domain, obtaining an output from each of a plurality of kernels in an extraction layer of a first trained (convolutional) neural network, wherein the first (convolutional) neural network is configured to identify one or more features in an image; for each of at least some of the kernels, aggregating the outputs corresponding to at least some of the input samples to generate an aggregate map corresponding to that/the kernel; resizing the aggregate maps to a lower resolution to generate a plurality of region maps corresponding to the aggregate maps, respectively (so that a single pixel in each region map corresponds to a fixed spatial region occupied by multiple pixels in the corresponding aggregate map) (each region map comprising at least one region corresponding to features identified in the input samples by the corresponding kernel); clustering the region maps to generate clusters of region maps, each cluster comprising region maps having similar regions (similar identified visual features); and training, using input samples of (associated with) a second domain, a second (convolutional) neural network with a kernel weight of at least one of the kernels which corresponds to at least one of the image regions (respectively) of at least one of the clusters.

According to an embodiment of a fourth aspect there is disclosed herein an information processing apparatus comprising a memory and a processor connected to the memory, wherein the processor is configured to: for each of a plurality of input samples of (associated with) a first domain, obtain an output from each of a plurality of kernels in an extraction layer of a first trained (convolutional) neural network, wherein the first (convolutional) neural network is configured to identify one or more features in an image; for each of at least some of the kernels, aggregate the outputs corresponding to at least some of the input samples to generate an aggregate map corresponding to that/the kernel; resize the aggregate maps to a lower resolution to generate a plurality of region maps corresponding to the aggregate maps, respectively (so that a single pixel in each region map corresponds to a fixed spatial region occupied by multiple pixels in the corresponding aggregate map) (each region map comprising at least one region corresponding to features identified in the input samples by the corresponding kernel); cluster the region maps to generate clusters of region maps, each cluster comprising region maps having similar regions (similar identified visual features); and train, using input samples of (associated with) a second domain, a second (convolutional) neural network with a kernel weight of at least one of the kernels which corresponds to at least one of the image regions (respectively) of at least one of the clusters.

Features relating to any aspect/embodiment may be applied to any other aspect/embodiment.

Reference will now be made, by way of example, to the accompanying drawings, in which.

Figure 1:
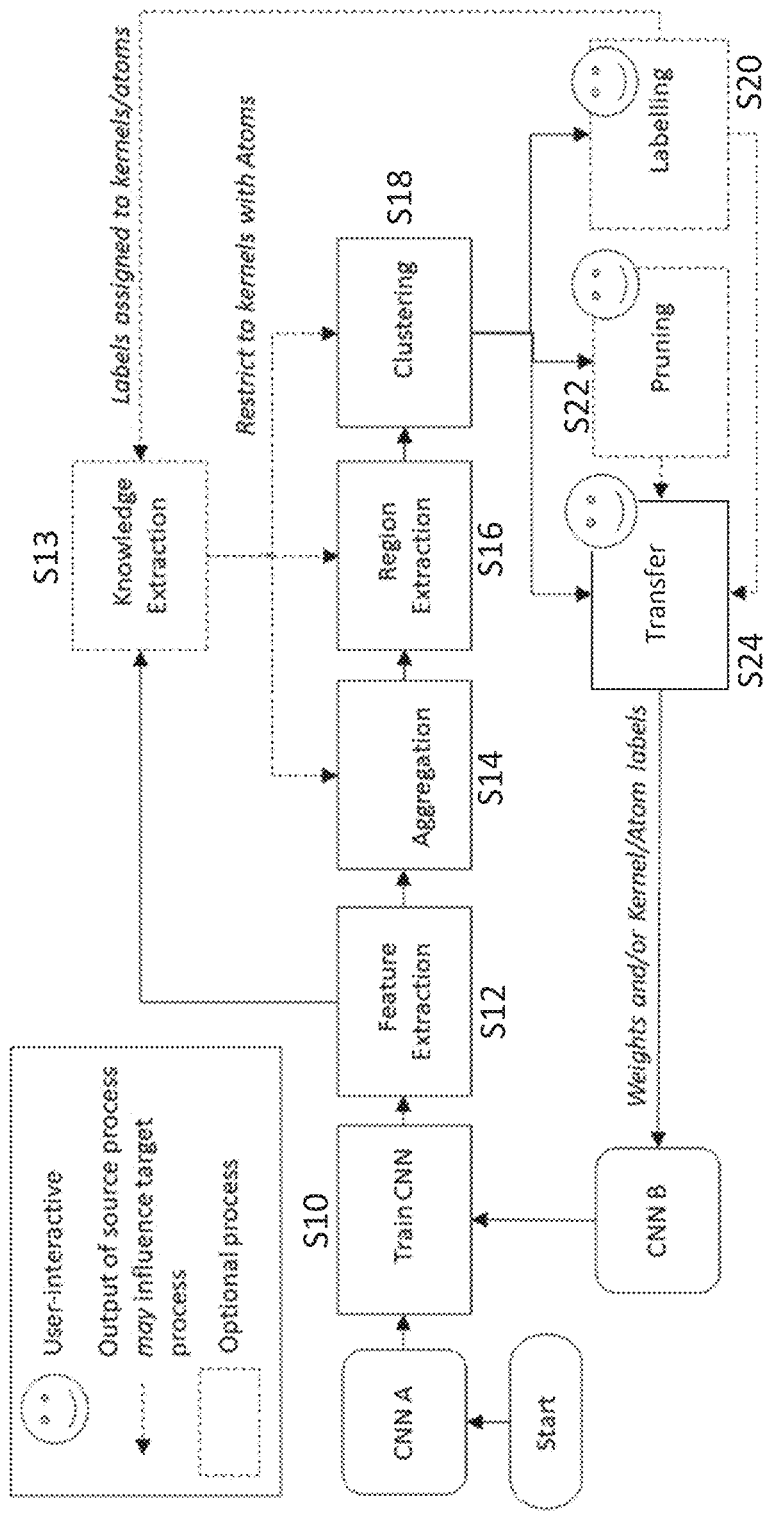
FIG. 1 is a diagram illustrating a method.

The following definitions may be used in the description.

Activation—The output value of an individual neuron, or in the context of CNNs, of a single value representing the overall activation map output by a kernel, so as to treat that kernel as if it were an individual neuron. The neuron/kernel is considered active if this value breaches some pre-defined threshold.

Activation of a neuron at position p,q within a kernel k for sample i may be denoted $A_{k,i,p,q}$ herein, where $A_{k,i}$ is the output activation map (see below).

Activation of a kernel when treated as if it were an individual neuron may be denoted $a_{k,i}$ herein.

Activation map—A tensor of activations output by a set of neurons such as a kernel or layer. Unless stated otherwise, it may be assumed that 'activation map' refers to the output of a kernel. The term 'activation matrix' or 'feature map' may be used in reference to the same.

An activation map for kernel k may be denoted $A_{k,i}$ herein.

ADAS (Advanced Driver Assistance System)—Electronic system that aids a vehicle driver while driving (e.g. parking assistance, traffic sign detection).

Aggregate Map—Defined herein as the aggregation of feature/activation maps output by a single kernel across multiple input samples.

Extraction Layer—The convolutional layer from which kernel activation/feature maps are extracted.

Feature detector—In the more general image processing sense, a method which detects whether a feature or set of features is present at a given region of an image. In the case of a neural network, this term refers to a set of weights trained to perform this purpose.

Each kernel of a CNN may be considered to be a feature detector.

Kernel—a location-invariant set of weights in a convolutional layer of a CNN that acts as a feature detector. Also referred to as a filter.

Region Map—Defined herein as an invariant representation of a region shared by all original features maps corresponding to a single kernel. Obtained (as described herein) by resizing an aggregate map.

SIFT (Scale-Invariant Feature Transform)—A type of feature detector that is robust against different image transformations (https://en.wikipedia.org/wiki/Scale-invariant_feature_transform).

SURF (Speeded Up Robust Features)—Another type of feature detector, argued to be more robust to image transformations than SIFT (https://en.wikipedia.org/wiki/Speeded_up_robust_features).

Furthermore, the transfer of kernels may be taken to mean the transfer of the weights of those kernels and optionally their labels.

The present invention resolves problems discussed above with a pipeline that represents a kernel by detecting the spatially invariant region of raw kernel outputs across training images (input samples), representing this as a low-resolution image (region map), and clusters kernels on the basis of these low-resolution regions. Clustering convolutional kernels on this basis means that regions represented by pixels in the low-resolution invariant region maintain their relative positions but are not separated by peculiarities of the dataset within those regions, or more generally.

FIG. 1 is a diagram illustrating a (kernel clustering and transfer) method. The method achieves efficient clustering of convolutional kernels according to downsized, invariant regions to support interactive transfer of weights and human annotations to related domains. As explained in the key in FIG. 1: steps illustrated in FIG. 1 with boxes using dotted lines are optional steps (other steps or parts of steps may also be optional as described below); arrows with dotted lines indicate that the output of the source step where the arrow starts may influence the target step where the arrow ends; and steps S20, S22, and S24 may be user interactive, i.e. operate based on user input, but this is not essential (furthermore other steps may be user interactive as described below).

The term "feature" may be used to refer to any region of interest in an image and therefore feature detection is an important task in image processing and computer vision more generally. Some feature detection methods such as SIFT (Scale-Invariant Feature Transform) and SURF (Speeded Up Robust Features) are able to detect features in a way that is robust to variations of those features such as variation in size, scale, orientation, occlusion, etc. SURF is claimed to be faster and more robust than SIFT with respect to this task. Both SIFT and SURF discover keypoints of an image, with each keypoint described as a feature vector that encodes orientation information. SIFT discovers keypoints by taking the difference between an image and its gaussian blur to remove edges and low-contrast local maxima. SURF achieves the same by applying box filters that are applied in a more memory-efficient way.

To avoid confusion, the term 'region' is used herein to describe invariant features e.g. as extracted by methods such as SIFT and SURF, and the term 'feature' is used to describe vectors and/or matrices extracted from neural network layers in which elements correspond to the importance of the input with respect to that element, and the vectors or matrices as a whole present an activation map across the layer. The term 'feature' may also be used to refer to particular parts of an image.

The method illustrated in FIG. 1 may be particularly useful in certain image processing or computer vision applications in which the placement of regions and their positions relative to each other remain constant across different input data (images) even if the information within the regions appears different. For example, the vision component of a self-driving car or ADAS (Advanced Driver Assistance System) system will always see sky above, the land, the road below, cars on the road, etc, but these parts will not necessarily be identical across different input data. In a frontal chest X-ray, the spine will always appear at the center with lungs found either side, but no two spines or sets of lungs will appear identical between patients. Convolutional neural networks (CNNs) are often applied in these contexts.

These contexts may be safety-critical, if for example the CNN in a car controls that car, part of it, or advises the driver; or if the CNN applied to X-rays suggests diagnoses to a doctor. In such contexts the behaviour of these networks may need to be accountable so mistakes may be understood and addressed for auditing, insurance, correction, etc.

Training

Figure 2:
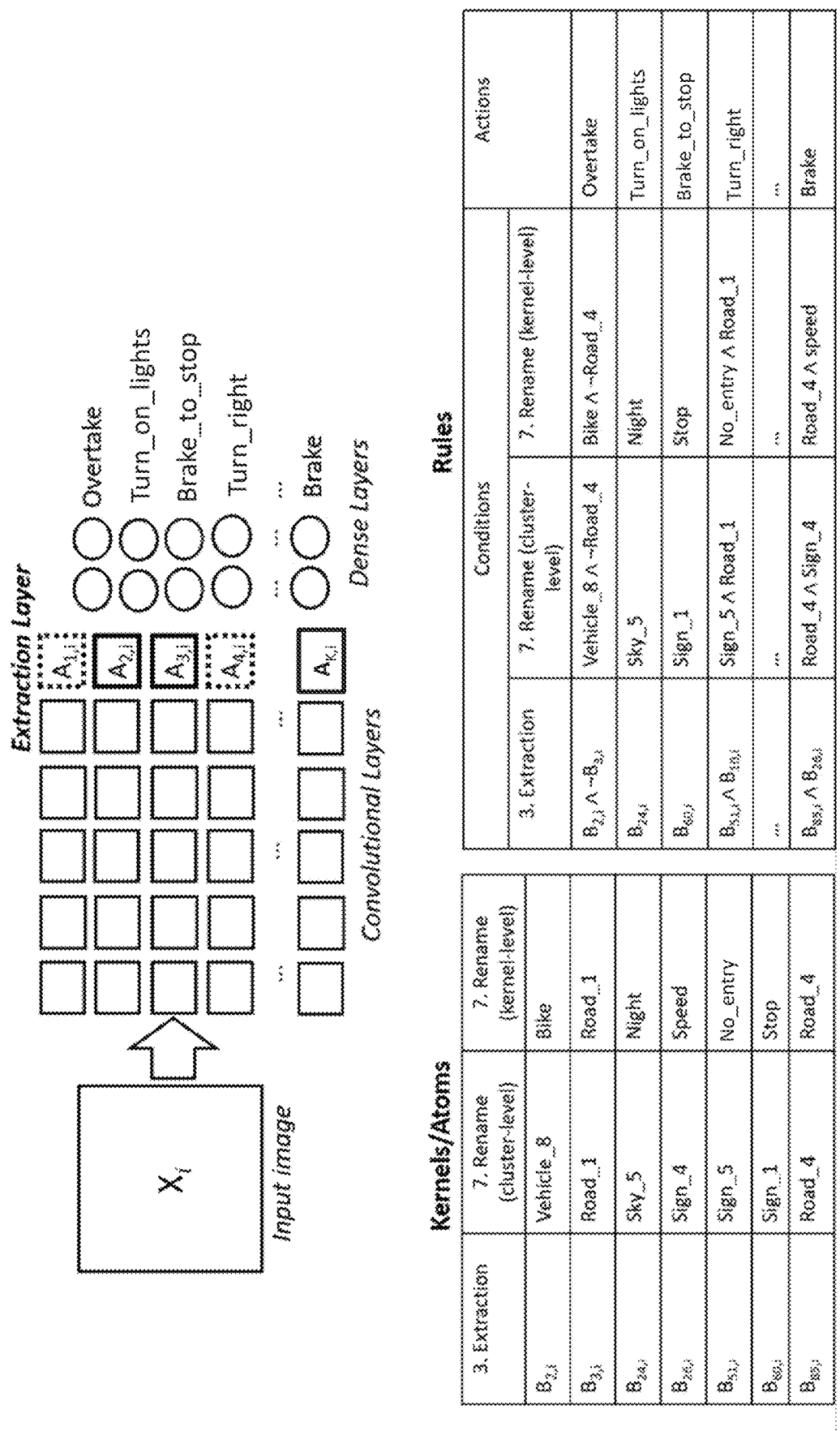
FIG. 2 is a diagram illustrating a convolutional neural network and extracted rules.

In step S10, CNN A is trained on dataset D={X, T} such that X refers to a set of n training images (input samples) and T to a set of n target integers denoting some class ID. The CNN A is a network for classifying images. The CNN A may instead be a network for analysing images including identifying one or more features in an image. Both X and T are indexed by i. An example of CNN A is illustrated in FIG. 2, described below.

Feature Extraction

In step S12, features are extracted from the CNN A. One layer of CNN A is designated as the layer from which to extract explanations (the extraction layer). K refers to the number of kernels at the designated extraction layer of CNN A and/K refers to a number of kernels to select for feature extraction (i.e. step S12). Some or all K kernels may be used in step S12. Any layer may be chosen as the extraction layer but the last layer is likely to be most suitable. For example, deeper layers respond to higher-level features such as objects and distinct regions, whereas shallower layers typically respond to lower-level features such as texture.

In step S12, each $A_{k,i}$ is obtained by a forward pass of each sample $X_i$ in dataset X. $A_{k,i}$ refers to the output (feature/activation map) of the kth kernel for input i and $a_{k,i}$ refers to its activation score derived from a function which maps the output Aki to a single value, such as L1 or L2 norm, max pool or other. The activation score $a_{k,i}$ may be referred to as the activation of kernel k for input i when it is treated as if it were an individual neuron as defined above. Mapping the output $A_{k,i}$ to a single value is a form of aggregation, though different from the aggregation step defined later (which aggregates feature maps from different input samples). In other words, a single value that represents the output of the whole kernel is derived from the outputs (activations) of all neurons in the kernel. As mentioned above, the function could be the L1 norm (the sum of the absolute values), L2 norm (the square root of the sum of the squared values, also known as the Euclidean norm), max pooling (which takes the maximum activation value across all outputs—more generally it generates a smaller tensor, not necessarily a single value, but in a running example the method would pool to a (1,1) tensor), or others.

As already mentioned, outputs of kernels may be referred to as feature maps or activation maps. The feature maps depict active regions for a given kernel with respect to all members of the dataset (that is, feature maps $A_{k,1}$ to $A_{k,n}$ illustrate the features in the input samples 1 to n, respectively, that the kernel k is configured to detect). Feature maps could be represented as images.

Knowledge Extraction

In step S13, which is optional, a rule extraction method may now be applied to extract a symbolic approximation of the network's behaviour, for example as a logic program or decision tree. Rule extraction algorithms usually involve a quantisation step which maps the output of a neuron or group of neurons (such as a kernel) to a single categorical (usually binary) value. In the next step, given this set of quantised neuron outputs, rules are formed which represent associations between those neurons and the outputs of the original model. Rules may be formed according to a decision tree construction algorithm such as C4.5 or a search.

Compatible rule extraction methods include ERIC (Extracting Relations Inferred from Convolutions) and the method described in Layerwise Knowledge Extraction from Deep Convolutional Networks, among others. In both cases the quantisation step maps kernel output activations to binary literals. The latter constructs rules according to a heuristic search whereas ERIC by default constructs rules according to the C4.5 algorithm. In both cases, however, once kernel outputs are represented by quantisation as matrices of (n,K) binary literals and target classes as a one-hot encoding of (n,C) where C is the number of classes, they are equivalent to the quantised outputs and target classes derived from arbitrary neural networks and therefore any rule extraction algorithm designed to map such input/output pairs to a set of rules may be applied. These include TREPAN, the extraction algorithm defined for CILP, and others. Output neurons may be considered in place of output kernels, e.g. when the rule is describing the assignment of network output classes, which are represented by individual neurons, not kernels.

In a running example, ERIC is used as the extraction method. Before constructing the rules according to the C4.5 algorithm, ERIC maps each $A_{k,i}$ to a binary activation value $B_{k,i}$ according to:

$$B_{k,i} = \begin{cases} 1 & \text{if } a_{k,i} > \theta_k \\ -1 & \text{otherwise} \end{cases}$$

$\theta_k$ is a predetermined value, such as the mean value of $a_{k,i}$ across all training samples. Each $B_{k,i}$ is an instance of a literal in the logic program, and without its polarity may be referred to as an atom (i.e. for atom P, the possible literals are {P, ¬P}). Thus, each unique atom corresponds to a kernel in the CNN A.

For all rule extraction algorithms, including ERIC, if neurons or kernels do not make a significant enough contribution to the behaviour of the network (because they only differentiate an insignificant number of training samples), the output logic program may not represent them (as atoms used in extracted rules). Which kernels are represented will depend on the extraction method. Thus, the number of kernels represented by the logic program may be less than or equal to the total number of kernels. Thus, the steps following step S13 may be limited to only those kernels represented by the program in order to reduce computational resources required (this is represented in FIG. 1 as dotted lines). Step S13 may be applied at a different time, i.e. between other steps or at the end of the process illustrated in FIG. 1.

Aggregation

Step S14 comprises, for each of at least some of the kernels, aggregating outputs corresponding to at least some of the input samples to generate an aggregate map (aggregate image) corresponding to that kernel.

That is, in step S14 /K≤K kernels may now be selected such that/$A_{k,i}$ refers to the feature maps output by those /K selected kernels. These /K kernels may be those that appear in the extracted logic program (i.e. as a result of step S13) or they may be chosen according to some other selection method (for example, given a value for /K (e.g. by a user), the selected kernels may be the /K kernels that activate (with respect to $B_k$ (and the training set)) most frequently, or they may be the /K kernels with the highest average value for $a_k$ ($a_k$ being a vector of activation scores across all the input samples) (for the training set), etc.). If /K=K, then all kernels are selected for step S14. Furthermore, also in step S14, for each kernel k, /n≤n input samples are selected to represent the dataset with respect to k. These samples may be the /n samples for which $a_{k,i}$ is highest, a random selection of n, a selection of /n input samples for which $a_{k,i}$ breaks some threshold, or /n input samples obtained by another selection method. In a running example, there is a given value of /n and the selected input samples are the /n input samples for which $a_{k,i}$ is highest. This may help to make the region maps obtained (described later) more useful because for each kernel the region map will be based on input samples that activate that kernel. In other words, kernels will only respond to certain features (i.e. the ones the method is aiming to discover region maps for), so for some input samples the output of a kernel may be completely blank (i.e. all 0) if the feature associated with that kernel is not present in the input sample (image). Therefore, it may be advantageous (but not essential) to use some but not all of the n input samples for every kernel. If /n=n, then all the input samples are selected.

For notational convenience henceforth it is assumed that/ K=K, /n=n, /$A_k$=$A_k$, etc.

For each kernel k, the n activation maps (i.e. outputs) from kernel k are aggregated into a single image $G_k$ referred to as an aggregate map. The aggregation function may be any function that maps n activation maps to a single image and is applied to each kernel k separately. In a running example, each element of $G_k$ ($G_{k,p,q}$) is calculated as the normalized sum across all $A_{k,i,p,q}$ for the kernel (k) concerned. That is, each element of $G_k$ may be calculated as a normalized sum of corresponding elements in the feature maps $A_{k,i}$/a corresponding element in each feature map, for all i. That is, each element of $G_k$ may be calculated as a normalized sum of an element in each feature map at a location within the feature map concerned corresponding to the location within the aggregate map $G_k$ of the element. The corresponding location may be referred to as the same relative location. Each element may be a pixel (though this is not to be confused with pixels in the original images, i.e. the input samples). The mean or a weighted sum (weighted for example by the softmax activation score for the class assigned by the CNN) across all $A_{k,i,p,q}$ for the kernel (k) could be used to calculate each element of $G_k$.

This aggregation identifies the most frequent activated hot-spots within the training dataset for the kernel concerned and for each aggregation image provides an initial focal region that provides a rich description of what an individual kernel encodes, i.e. what features the kernel is identifying or configured to identify in a given input image.

Region Detection

Step S16 comprises resizing the aggregate maps (aggregate images) to a lower resolution to generate a plurality of region maps $H_k$ corresponding to the aggregate maps, respectively, i.e. so that a single pixel in each region map corresponds to a fixed spatial region occupied by multiple pixels in the corresponding aggregate map. Each region map $H_k$ comprises at least one region corresponding to features identified in the input samples by the corresponding kernel k.

That is, in step S16 a region detection operation is applied to each $G_k$ to obtain a region map $H_k$. This step comprises resizing the aggregation map to a lower resolution as mentioned above so that a single pixel in a given region map $H_k$ represents a fixed spatial region occupied by multiple pixels in the corresponding aggregate map $G_k$ (and by extension a spatial region occupied by multiple pixels across each $A_{k,i}$ (for all n (or, more specifically, /n))).

In addition, a more sophisticated operation such as SURF or SIFT may be used to discover transformation-robust features. The aggregation map $G_k$ is then resized as described above. Resizing alone still provides the necessary robustness. It is assumed that the spatial region that a given kernel responds to is fixed across samples (i.e. the spatial region of each input sample (image) containing the feature(s) which the given kernel detects is at least approximately the same for all (or at least most of) the input samples—for example the sky is always at the top of an image taken by a self driving car), thus any variation in a given region of the corresponding aggregate map $G_k$ would still likely map to a pixel of similar intensity in the corresponding region map $H_k$ compared with other pixels. That is, small features may be "smoothed out" by the resizing step so that they do not affect the overall region detection. Furthermore, the resizing step may help to smooth out variations that may be less likely to be averaged out by the previous aggregation step (for example if the number /n of input samples is relatively small).

Clustering

Step S18 comprises clustering the region maps to generate clusters of region maps, each cluster comprising region maps having similar identified visual features. Here, "similar identified visual features" refers to "features" in the image processing sense of the region maps, and not to "features" of the sample inputs that the kernels detect, as defined above. Of course, each region map $H_k$ comprises at least one region corresponding to features identified in the input samples by the corresponding kernel k. Therefore it may be said that step S18 comprises clustering the region maps to generate clusters of region maps, each cluster comprising region maps having similar regions (with a given region corresponding to features identified in the input samples by the corresponding kernel k, as above).

In a running example, the region maps are clustered on the basis of pixel intensity, and position information of "regions" or "features" is inferred by proxy of this information (pixel intensity). For example, if intensity >0 (or some other threshold) for a given pixel in two region images, then the regions represented by both images overlap with respect to that pixel, even though the intensities may be different. If intensity >0 for exactly the same set of pixels (in terms of the pixels' positions) in both region images then both region images represent the same region.

The kernels corresponding to the region maps may also be considered to be clustered in the same way, giving rise to clusters of kernels (that is, a region map cluster comprising regions maps $H_1$ and $H_2$ may be considered to give rise to a corresponding kernel cluster comprising kernels 1 and 2). Therefore it may be said that kernels are clustered according to their corresponding region maps.

Figure 4:
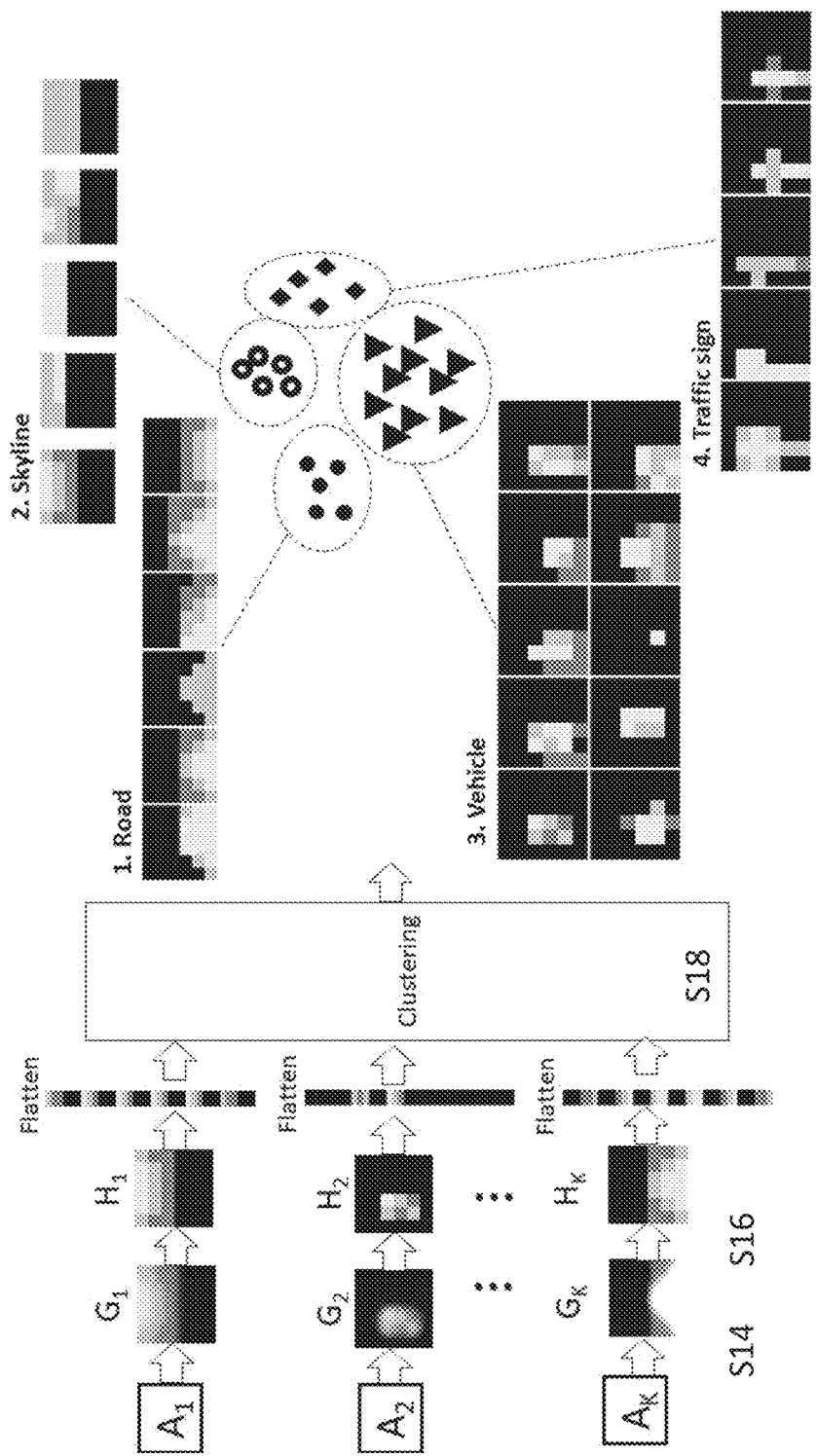
FIG. 4 is a diagram useful for understanding the method of FIG. 1.

In a running example, in step S18, the kernels are clustered according to flattened representations of their region maps as shown in FIG. 4 and as described in more detail below. K-means clustering or any other clustering method could be used. Flattening is a procedure to make tensors more simple to process by reshaping them into vectors with the same number of elements. For example, a 3D tensor of shape [10×3×3] may be reshaped to a vector of length 90 (10*3*3). The region maps may be clustered without flattening.

Labelling

Figure 5:
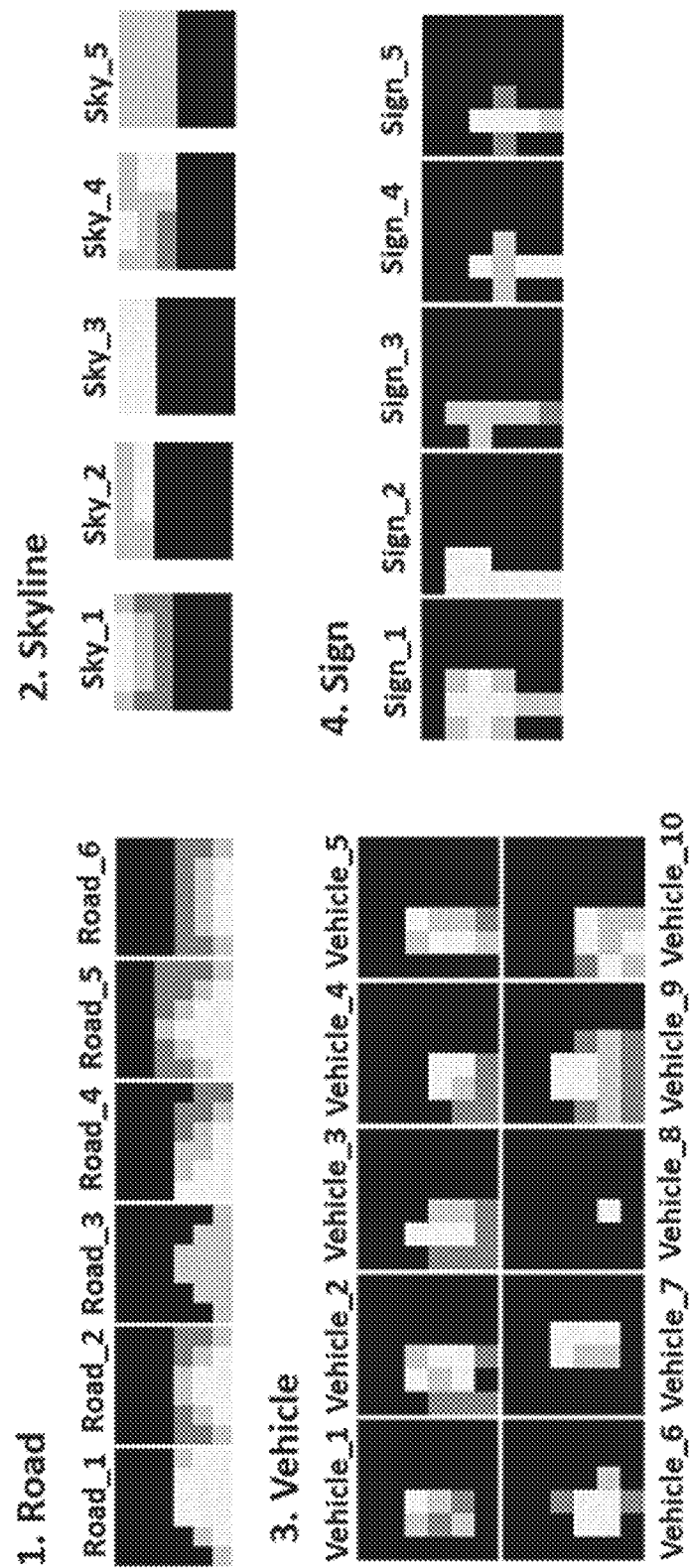
FIG. 5 is a diagram illustrating labelled clusters.
Figure 6:
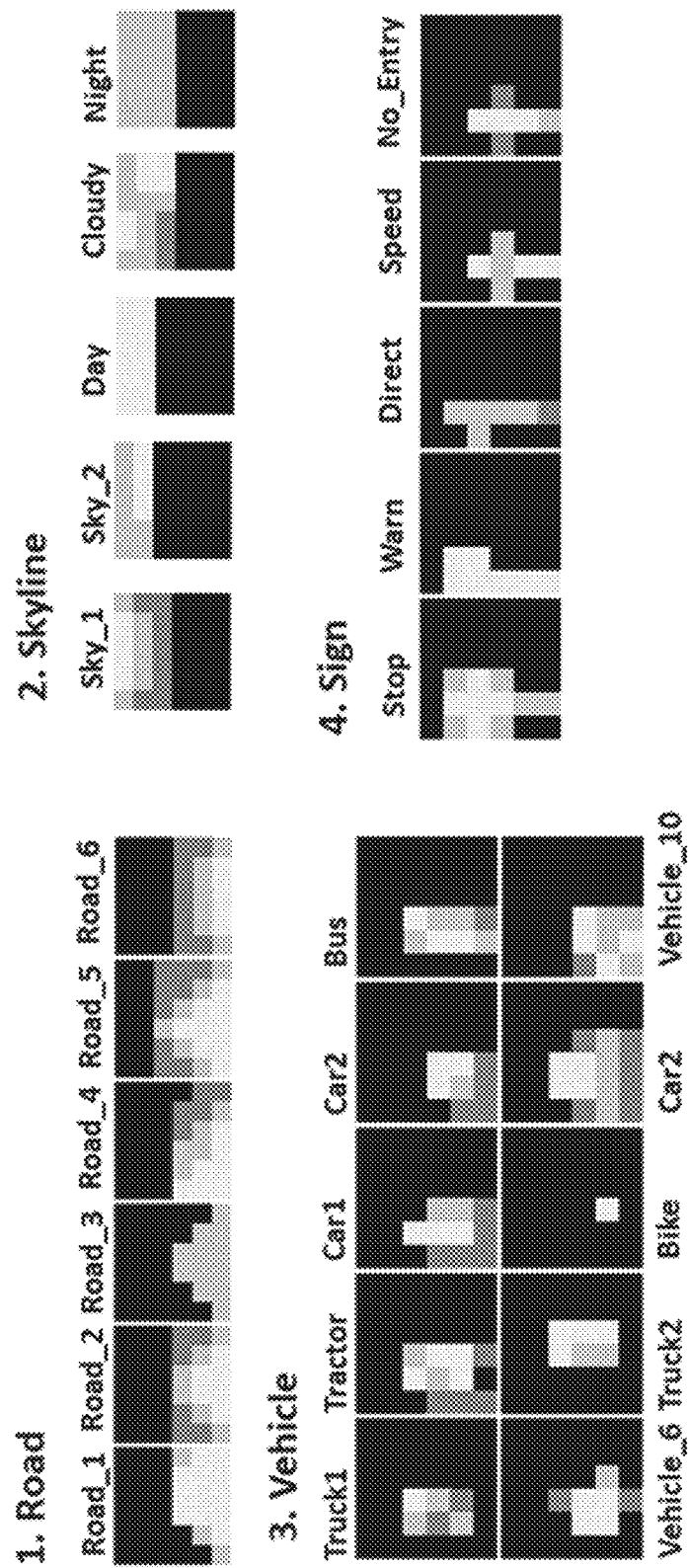
FIG. 6 is a diagram illustrating labelled clusters.

In step S20, which is optional, the kernels are labelled. At this point, a user has the option of assigning labels to kernels in the network. Kernels may have labels assigned at two levels: cluster-level and individual level. By default, a cluster-level label is inherited by each kernel in the cluster, but with a unique integer or other identifier appended to the end of the label (FIG. 5). Individual kernels may then be assigned a name if the user so wishes (FIG. 6). Kernels not individually renamed retain their inherited label.

If rules have been extracted, atoms may be assigned the labels of corresponding kernels (FIG. 2). If not, then atoms will automatically be assigned the labels of corresponding kernels when the logic program is extracted. This is illustrated by the dotted arrow from step S20 to step S13 in FIG. 1.

Labelling could also be implemented automatically using e.g. image processing techniques. For example, the method could include analyzing (some of) the region images of a cluster to detect what features the corresponding kernels identify, and then labelling the cluster/the kernels accordingly, that is, according to the feature in the input samples (images) the kernels of the cluster detect (e.g. labelling them as "sky" if it is found the kernels of that cluster detect sky, or "road" if it is found the kernels of that cluster detect road, or any other particular visual element, etc). For example the method may (automatically) compare the outlines of the region maps (the regions within those images, in particular) to regions in at least one pre-defined chart. An example in the context of healthcare /medical applications is comparing the region maps to a labelled anatomical chart—kernels for which the region maps include regions which generally overlap the region of a particular body part (e.g. lungs) in the anatomical chart would be labelled as such (e.g. as 'lungs').

Transfer

Step S24 comprises transferring weights of the kernels corresponding to the image regions of at least one cluster for use by a CNN in a target domain (i.e. CNN B in FIG. 1). Alternatively or additionally, step S24 may be considered to comprise implementing a CNN (CNN B) using input data /sample inputs of or associated with a target domain and using weights of the kernels corresponding to the image regions of at least one cluster. That is, in step S24 kernel weights are transferred to the second network (CNN B) to simplify learning in that network.

Step S24 may comprise user interaction. Kernel weights and/or labels may be selected by the user to be transferred to a second network to simplify learning in that network. This is exemplified in and further described with respect to FIG. 7. Rather than selecting kernels individually, the user may select large groups in the form of their corresponding clusters. Network weights of selected kernels, and optionally the labels of those kernels, are copied from CNN A to CNN B.

Some or all of these copied /transferred weights may be frozen in CNN B so that further training cannot modify them, and/or some or all of these copied /transferred weights may be left unfrozen so that those weights serve as a start point for learning particular features pertaining to the domain of CNN B (the target domain) with respect to the region the kernel responds to (i.e. with respect to the features that the kernels whose weights have been transferred are configured to detect in input samples (images)). Kernels in CNN B that do not inherit weights or labels from their equivalents in CNN A may have weights set to some random initialisation, and are assigned arbitrary, default kernel labels.

Weights in layers before and/or after the extraction layer may also be transferred to CNN B, for example if the source and target networks (CNN A and CNN B) share the corresponding architecture in those layers. That is, the processing of steps S12-S24 may be repeated for other such layers (as the step S10 trains all layers).

The user interaction in step S24 is optional. Instead, step S24 may be implemented automatically. For example, kernel weights corresponding to clusters of a certain size (threshold number of region maps in the cluster) or bigger may be transferred. For example, kernel weights corresponding to the largest cluster may be transferred.

Alternatively or additionally, image recognition processing may be utilised. For example, the method may include analyzing (some of) the region images of a cluster to detect what features the corresponding kernels identify, and then selecting them for transfer/transferring them if it is found the kernels of that cluster detect sky, or road, or any other particular visual element, etc. For example the method may (automatically) compare the outlines of the region maps (the regions within those images, in particular) to regions in at least one pre-defined chart. An example in the context of healthcare /medical applications is comparing the region maps to a labelled anatomical chart—kernels for which the region maps include regions which generally overlap the region of a particular body part (e.g. lungs) in the anatomical chart would be transferred /selected for transfer.

A combination of automatic and user interactive selection may be used. For example, clusters of a certain size or larger may be selected and the user may then select from those clusters which should be transferred.

Pruning

In step S22, which is optional and which precedes step S24, weights of some kernels may be selected for pruning and then all weights except these weights will be transferred in step S24.

That is, the weights for selected kernels, whether directly or by proxy of their cluster, may be selected for pruning. In practice, this may be implemented by setting their weights to 0 and freezing those weights so they may not be modified in later training runs (because of the way networks are defined in programming architectures, for any pair of neurons D and E where D and E are in different layers, it is assumed there is some weight between them, but a value of 0 is equivalent to no connection at all), or by transferring all weights but those corresponding to pruned kernels to the second network (CNN B) with the appropriate number of kernels.

Step S22 may comprise user interaction. A user may select weights for pruning. Alternatively, this step may be automatic. For example, weights of kernels belonging to a cluster less than a certain size (threshold number of region maps in the cluster) may be selected for pruning. For example, the weights of kernels of the cluster comprising the fewest region maps may be selected for pruning. Step S22 may be a combination of automatic and user-directed. For example, weights of kernels belonging to a cluster less than a certain size (threshold number of region maps in the cluster) may be selected for pruning automatically and then (through user interaction) a user may select at least one further weight /cluster for pruning and/or reverse some of the automatic selection.

Step S22 may of course be implemented as well as the selection in S24. For example, weights of kernels belonging to a cluster less than a certain size (threshold number of region maps in the cluster) may be selected for pruning automatically in step S22 and then in step S24 a user may select which remaining weights will be transferred to CNN B.

Step S13, which is optional, may be implemented immediately after step S12 or S14 or S16. Step S13 may also be implemented at any other time. The output of step S13 (rules applied by kernels) may be used in later steps. For example, steps S14, S16, or S18 may be restricted to particular kernels based on the output of step S13, e.g. only kernels with atoms, i.e. kernels with associated rules.

Methods according to the present invention may not comprise implementing the second CNN (CNN B). Such methods may comprise the other steps and end with the clustering of step S18 which enables kernels to be transferred to a second CNN.

An example application of the kernel clustering and transfer method will now be described.

This example considers a CNN-based control unit for a self-driving car trained to operate in the UK, later to be transferred to a US context. To facilitate clarity in explanations, the scenario is simplified with respect to what would be a more realistic scenario. Inputs to the CNN are images from the on-board camera, and outputs correspond to actions for the car to perform in response to its surroundings.

Common to both countries is a roughly horizontal division between land and sky. In both countries cars and traffic signs may be observed at the sides of the images, however the relevant sides of the image will differ between the two countries. Most traffic signs relevant to the driver will appear on the left in the UK, and on the right in the US. Similarly, cars will be driving the same way as the driver (facing away from the driver) on the left in the UK, but on the right in the US. For simplicity the opposite stream of traffic is ignored in this example. Further, traffic signs in the two countries are very different in appearance. For example, speed limit signs are circular in the UK, but square in the US.

The goal is to transfer clusters of land and sky-related kernels (i.e. their weights) and their labels from one country to another (i.e. from CNN A which operates based on input data (input samples) which are images in the UK, to CNN B which operates based on input data (input samples) which are images in the US), but exclude vehicle and traffic-sign related kernels so that they may be learned anew from the second dataset (the images in the US).

Training

CNN A (UK) is trained (step S10) on dataset D={X, T} in which X is a set of frames from a dashboard camera and T is a set of actions for the car to perform. CNN A learns to associate the frames with the actions. A rough illustration of the CNN A may be found at the top of FIG. 2. FIG. 2 illustrates the CNN A and example rules that are later extracted to describe its behaviour in terms of convolutional kernels in a designated extraction layer. Kernels not represented by the extracted rules are shown with broken borders. The lower part of FIG. 2 shows rules as they are represented upon receiving different labels at different steps of the process (as described below).

Knowledge Extraction

In step S13, a rule extraction algorithm such as ERIC is applied to translate the behaviour of CNN A into a set of rules, for example those shown in FIG. 2, bottom right-hand corner. Each atom in the rule set corresponds to a kernel and initially has no label. The rules are conjunctions over these atoms that when satisfied trigger the action represented by the consequent of the rule. Labels are assigned to the kernels in later steps in this example.

Feature Extraction, Aggregation, and Region Extraction /Detection

Figure 3:
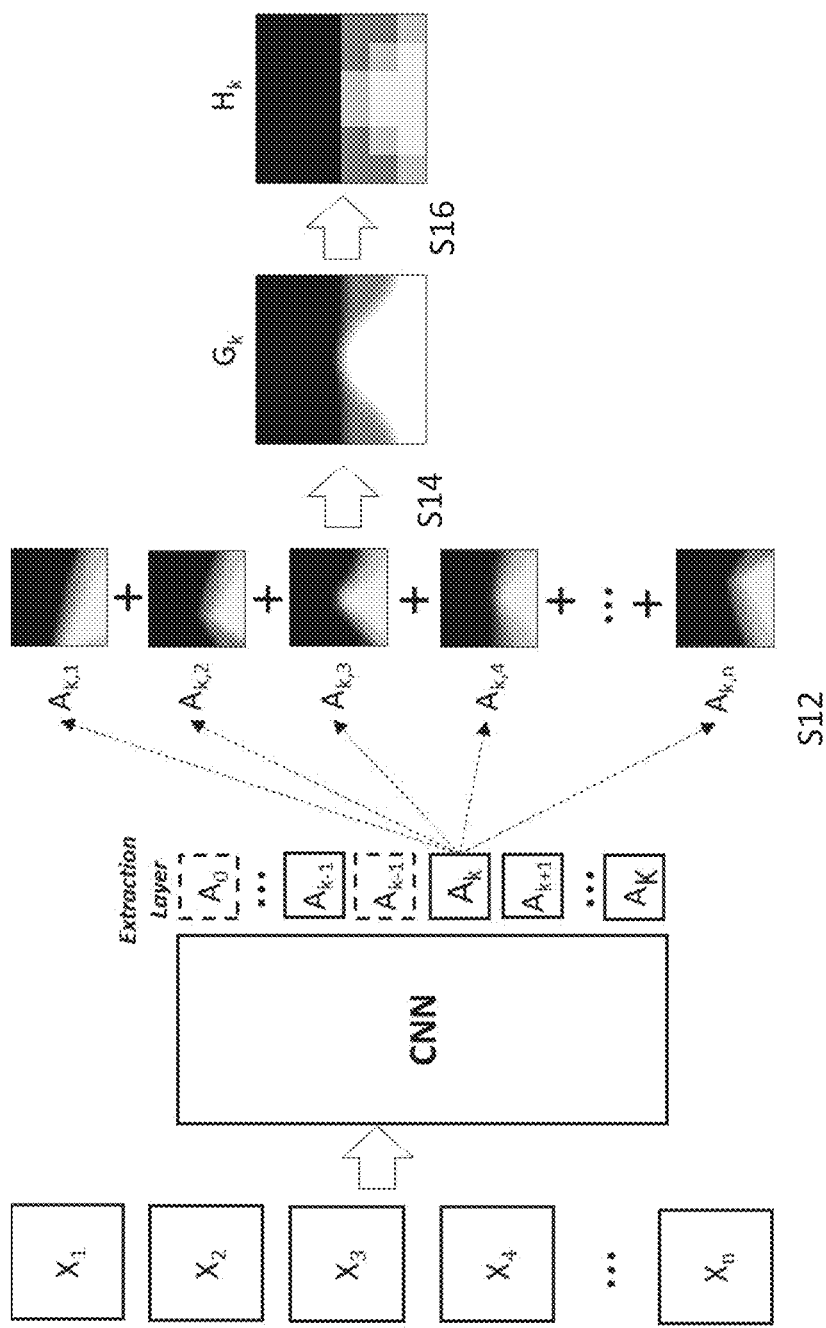
FIG. 3 is a diagram useful for understanding the method of FIG. 1.

FIG. 3 illustrates steps S12, S14, and S16.

One layer of CNN A is designated as the layer from which to extract explanations (the extraction layer), and the kernels in this layer have a dimension of 60×60. The notation $A_k$ denotes a tensor corresponding to kernel k of the features maps $A_{k,i}$ for all i. That is, if $A_{k,i}$ has dimension (h,w) then $A_k$ has dimension (n,h,w), where n is the number of training samples and h,w are the height and width of the kernel outputs (feature maps). The raw output is taken from all kernels of this layer for all images in the training set (i.e. all input samples). For example, in FIG. 3, kernel k reacts to the region of the image containing the road, and the feature maps $A_{k,1}$ to $A_{k,n}$ depict active regions for this kernel with respect to all members of the dataset (that is, feature maps $A_{k,1}$ to $A_{k,n}$ illustrate the features in the input samples 1 to n, respectively, that the kernel k is configured to detect).

At the convolutional layer designated as the extraction layer, an image $G_k$ (an aggregation map) represents a normalized aggregation of outputs for kernel k over a set of training images X. $G_k$ is transformed to image $H_k$ (a region map) according to a region detection method. Broken borders indicate kernels which skip this process because they are not represented by any atoms used in an extracted logic program as a result of step S13.

More specifically, for this example we take /n=n, i.e. an aggregate map $G_k$ is generated for each kernel from all samples. In FIG. 3, $G_k$ is obtained by summing and normalising each pixel across $A_{k,1}$ to $A_{k,n}$, and $H_k$ is obtained by resizing each image in $G_k$ from 60×60 to 6×6 pixels. Thus, each pixel in $H_k$ represents a fixed spatial region of 10×10 pixels in $G_k$. In this example, this is repeated for all kernels represented by atoms used in the rules of the logic program (though of course in other examples the process may be applied to all kernels whether or not step S13 has been carried out). In FIG. 3, kernels not represented by any atoms used in the extracted rules are shown with broken borders.

Clustering and Labelling

FIG. 4 illustrates steps S14, S16, and S18. Steps S14, and S16 are the same as described above with reference to FIG. 3 (except in FIG. 4 these steps are illustrated as being implemented for multiple kernels).

In step S18, the kernels are clustered based on the corresponding region maps $H_k$ (flattened into a 36×1 vector) according to the k-means clustering algorithm. That is, the kernels are clustered according to their flattened region maps. Four clusters emerge, which upon examining the highlighted regions (which represent features that the kernels corresponding to these region maps are configured to identify), appear to correspond to the locations of roads (1), sky (2), vehicles (3) and traffic signs (4). The user labels these as such, and the corresponding kernels inherit the name of the cluster plus an incrementing integer value. These labels are illustrated in FIG. 5. These new labels are also applied to the extracted rules in FIG. 2.

The user then chooses to assign labels to some of the individual kernels, having inspected training images which strongly activate these kernels (based on binary activation values $B_{k,1}$ defined above—if positive, then the image may be said to have activated that kernel). These labels are shown in FIG. 6, and the rules in FIG. 2 are again updated. Labels not renamed (all road kernels, 2/5 sky kernels and 2/10 vehicle kernels in this case) retain their inherited labels.

The rules extracted earlier in step S13 and shown in FIG. 2 now have more distinct meanings. Should the car controlled by this network make some error in need of investigation, the rule best describing the action taken may be inspected to understand what led the car to make this decision.

Transfer

Figure 7:
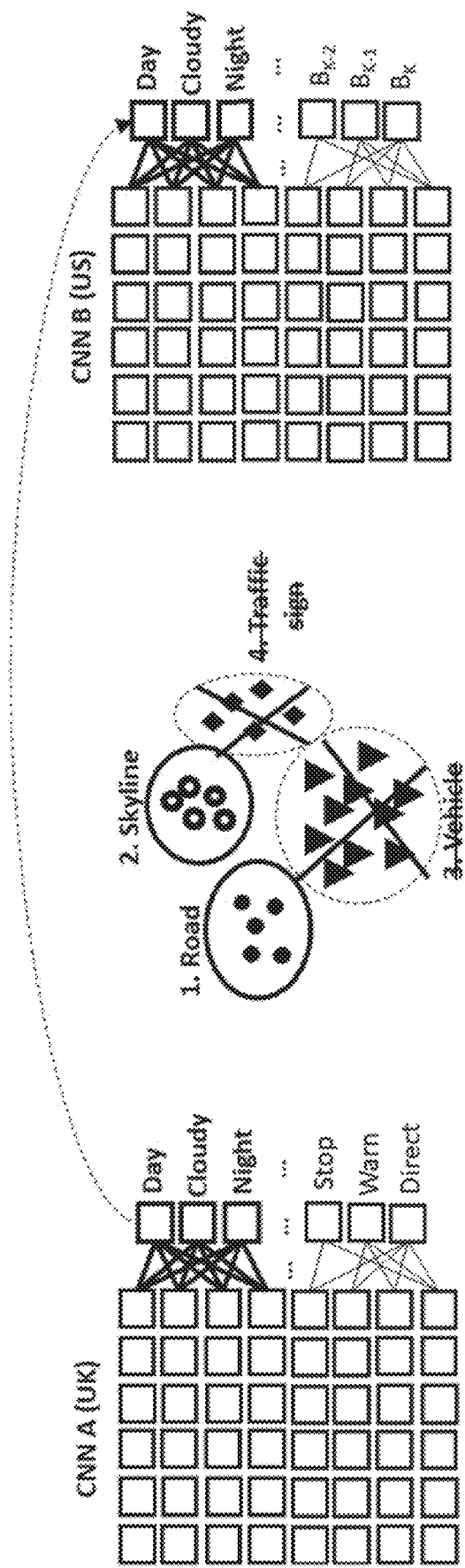
FIG. 7 is a diagram illustrating kernel transfer.

FIG. 7 illustrates step S24, i.e. transferring labelled kernels and their weights to a second CNN. Kernels are selected indirectly via their cluster by the user.

That is, the user now wishes to transfer the network CNN A (which has been trained to drive a car in the UK) to cars programmed to drive in the US without having to rename all of the kernels. However, the car and traffic sign kernels are specific to the UK because they only appear on the left. Furthermore, traffic signs in the two countries differ greatly in appearance. Thus, the user chooses to exclude these kernels from the transfer as only the road and skyline clusters are transferrable to the US context, and selects the road and skyline kernels for weight and label transfer from CNN A to CNN B. Instead of selecting kernels individually, the user may perform the task more efficiently by selecting entire clusters.

In order to effect "transfer" of the selected kernel weights, the model (i.e. CNN A with its weights and labels) is copied, and then weights for the kernels being transferred (clusters 1 and 2) are frozen, whilst weights for vehicle kernels (cluster 3), which are only changing position, remain plastic (i.e. transferred but only as a start point for learning in CNN B), and those for traffic signs (cluster 4), which are considerably different in appearance, are reset to some random initialisation. The copied model with the frozen, plastic, and rest weights is then trained on the US dataset. This copied model is referred to as CNN B. Steps S12, S14, S16, S18, and optionally steps S13 and S20, are repeated for CNN B, and a new set of clusters is determined containing the identical labels for clusters 1 and 2 (road and skyline). The user now only needs to relabel clusters 3 and 4, which still correspond to vehicles and traffic signs.

Pruning

Figure 8:
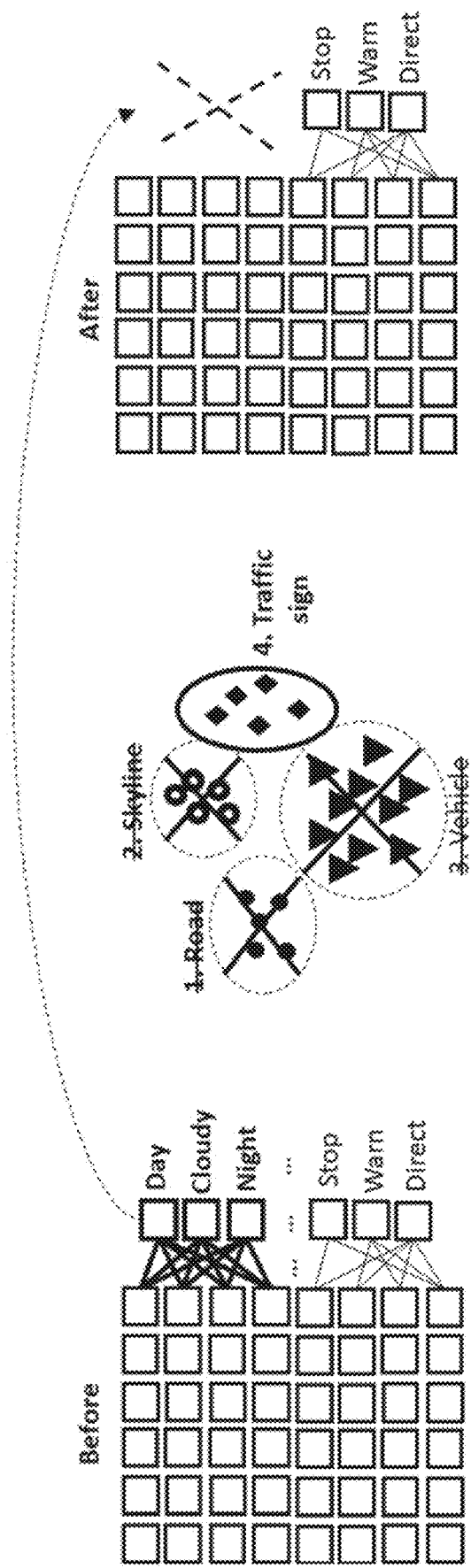
FIG. 8 is a diagram illustrating kernel transfer.

FIG. 8 illustrates step S22, i.e. pruning.

That is, later the user decides they want to repurpose CNN A for traffic sign detection only. By selecting all clusters but the traffic sign cluster, they are able to prune all unnecessary kernels and then copy the model for use in traffic sign detection.

The technology may also be applied to a medical context, for example on frontal chest X-rays. Key regions of these scans (lungs, heart, spine, etc) are ubiquitous across datasets, even though different datasets may differ in a variety of ways such as image quality, the presence or absence of intubation, annotations on the scans, and the symptoms being detected. For example, some datasets may all be of patients with some form of pneumonia with the classification task being to distinguish between types, whereas another dataset may contain healthy patients in one class and COVID-19 patients in another. In both cases the CNNs may need to be accountable so that any classifications made may be verified by a doctor, with extracted rules over labelled kernels providing explanations to support this. Weights learned by and labels assigned to a CNN trained for one of these tasks may be transferred to another, in order to speed up training and also so that the doctor /user would not need to go to the trouble of labelling ubiquitous regions a second time.

In general, the methodology disclosed herein may be useful for any kind of transfer learning in CNNs applied to domains with spatially specific regions but variation in pixel intensity within those regions across datasets. In other words, the methodology disclosed herein may be applied to any domains in which images (as input data /training data /input samples) in both domains have regions in common, that is, regions which are spatially similar but which have pixel intensity variation across (and/or between) datasets.

The technology is also useful as a form of interactive pruning. For example, a domain expert may decide that the region represented by a cluster is irrelevant or should have no bearing on a classification that is made, and thus choose to prune all kernels contained within this cluster by selecting the cluster as a whole rather than having to select the individual kernels.

In summary, embodiments of the invention may achieve the following. Clusters may be assigned to specific regions in an image which are invariant to changes within samples, and in such a way as to simplify the task of interactively assigning labels to support interpretability, because labels may be applied to entire clusters rather than single kernels, and the number of kernels to be clustered (and therefore labelled) may also be constrained to those kernels which are represented in the extracted knowledge if this step (step S13) is performed.

To account for variations both within a dataset and between the datasets (i.e. in order to transfer kernels and their labels between similar domains that share regional information but differ with respect to finer details), kernels may be clustered according to low-resolution, spatially-invariant region maps that are generated by down-sampling (resizing) an aggregation map of a kernel's outputs to the lower resolution or even detected using feature detection methods such as SURF or SIFT.

As a comparative example, clustering raw outputs of kernels risks overfitting the clustering to the training data and does not guarantee regional invariance between domains. Furthermore, this may be more computationally expensive than necessary. On the other hand, as another comparative example, clustering kernels based on their norms or other scalar approximations is computationally cheaper but yields too much information loss, particularly with respect to regional information.

That is, the comparative example kernel clustering methods are unsuitable for applications with consistent regions across samples and even datasets but with highly likely variation within those regions. For example, CNNs in autonomous vehicles always expect to see sky above, road below, and buildings to the left and right, however when used in another country the buildings, which will still be in the same relative location, may appear different. For example, Japanese houses are built differently from British houses, and whilst stores in both countries are likely to have writing on signs outside them, these will be in Latin characters in the UK but Japanese characters in Japan.

Clustering over lower-resolution representations of kernels as opposed to raw feature maps output by the kernels (i.e. using region maps as opposed to feature maps) reduces the complexity of, and therefore resources required to perform, clustering.

The grouping (clustering) of kernels makes human interaction with them a simpler task, as kernels may be readily selected as a cluster for labelling, pruning, transfer, or other actions, as opposed to selecting kernels individually.

This simplifies human interaction with respect to selecting kernels for pruning, which reduces the computational cost of executing the CNN, or for transfer to a related domain, which simplifies the task of training another CNN on that second domain.

Automatic selection and transfer of kernels based on a threshold number of region maps facilitates learning in the second CNN (e.g. CNN B) because only kernels which are configured to detect the most "important" features of input images are transferred. For example, it may be advantageous to transfer only the most significant /important kernels to a new CNN to have a more simplified CNN to work with for a different application.

Figure 9:
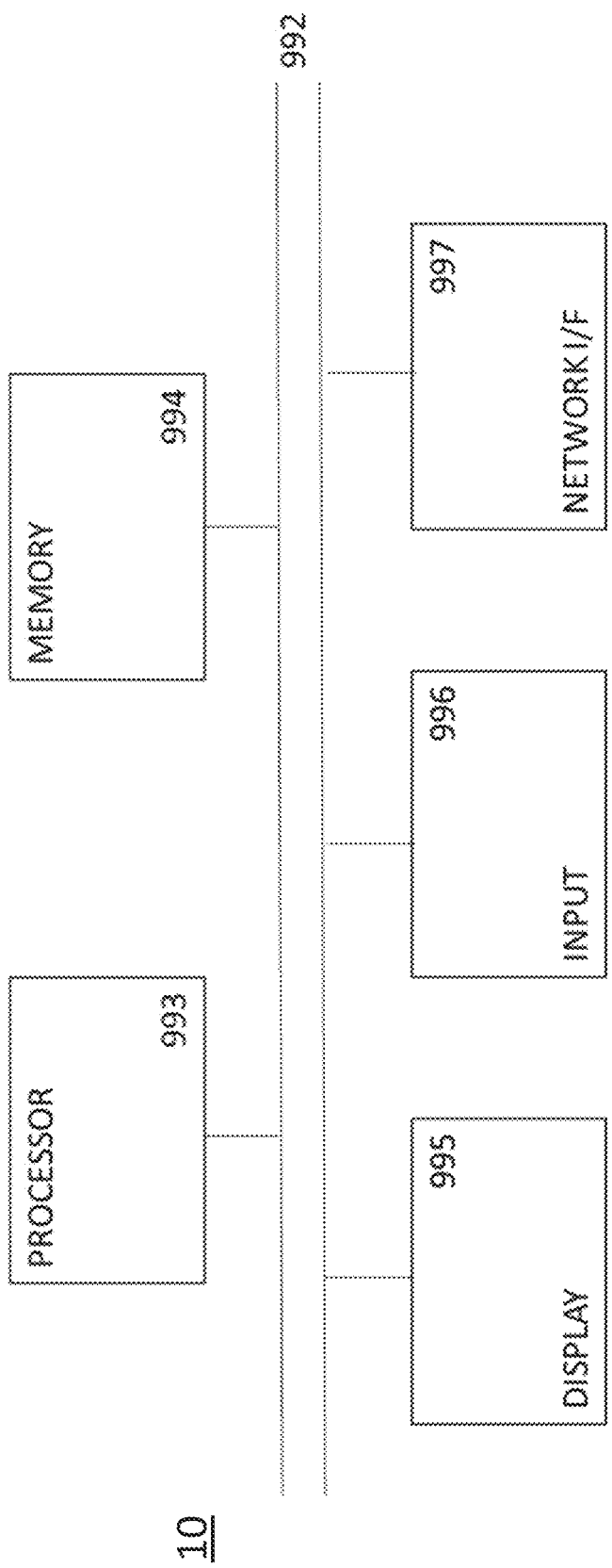
FIG. 9 is a diagram of an information processing apparatus.

FIG. 9 is a block diagram of an information processing apparatus 10 or a computing device 10, such as a data storage server, which embodies the present invention, and which may be used to implement some or all of the operations of a method embodying the present invention, and perform some or all of the tasks of apparatus of an embodiment. The computing device 10 may be used to implement any of the method steps described above, e.g. any of S10-S24 in FIG. 1.

The computing device 10 comprises a processor 993 and memory 994. Optionally, the computing device also includes a network interface 997 for communication with other such computing devices, for example with other computing devices of invention embodiments. Optionally, the computing device also includes one or more input mechanisms such as keyboard and mouse 996, and a display unit such as one or more monitors 995. These elements may facilitate user interaction. The components are connectable to one another via a bus 992.

The memory 994 may include a computer readable medium, which term may refer to a single medium or multiple media (e.g., a centralized or distributed database and/or associated caches and servers) configured to carry computer-executable instructions. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing a method disclosed herein, or any method steps disclosed herein, for example the method or any method steps illustrated in FIG. 1 (steps S10, S12, S13, S14, S16, S18, S20, S22, and/or S24). Thus, the term "computer-readable storage medium" may also include any medium that is capable of storing, encoding or carrying a set of instructions for execution by the machine and that cause the machine to perform any one or more of the method steps of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement any of the method steps described herein. The memory 994 stores data being read and written by the processor 993 and may store at least one CNN (CNN A and/or CNN B, for example) and/or extracted knowledge (e.g. rules, atoms, literals, labels) and/or kernel weights and/or information regarding clusters of kernels/region maps and/or user preferences and/or rules pertaining to automatic selection /pruning /transfer/labelling. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device, such as a CNN (A and/or B) and/or extracted knowledge (e.g. rules, atoms, literals, labels) and/or kernel weights and/or information regarding clusters of kernels/region maps and/or user preferences and/or rules pertaining to automatic selection/pruning/transfer/labelling and/or interactive representations enabling a user to select/prune/transfer/label kernel weight(s) (clusters) by e.g. drag and drop interaction, and/or any other output described above, and may also display a cursor and dialog boxes and screens enabling interaction between a user and the programs and data stored on the computing device. The input mechanisms 996 may enable a user to input data and instructions to the computing device, such as enabling a user to select/prune/transfer kernel weight(s)/cluster(s).

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device/apparatus 10 such as that illustrated in FIG. 9. Such a computing device need not have every component illustrated in FIG. 9, and may be composed of a subset of those components. For example, the apparatus 10 may comprise the processor 993 and the memory 994 connected to the processor 993. Or the apparatus 10 may comprise the processor 993, the memory 994 connected to the processor 993, and the display 995. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The above-described embodiments of the present invention may advantageously be used independently of any other of the embodiments or in any feasible combination with one or more others of the embodiments.

What is claimed is:

1. A computer-implemented method comprising:
    for each of a plurality of input samples of a first domain, obtaining an output from each of a plurality of kernels in an extraction layer of a first trained convolutional neural network, wherein the first convolutional neural network is configured to identify one or more features in an image;
    generating a plurality of aggregate maps corresponding respectively to at least some of the kernels by, for each of the at least some of the kernels, aggregating the outputs from the kernel and corresponding to at least some of the input samples to generate an aggregate map corresponding to that kernel;
    resizing the aggregate maps to a lower resolution to generate a plurality of region maps corresponding to the aggregate maps, respectively;
    clustering the region maps to generate clusters of region maps, each cluster comprising region maps having similar regions; and
    training, using input samples of a second domain, a second convolutional neural network with a kernel weight of at least one of the kernels which corresponds to at least one of the image regions of at least one of the clusters.

2. The computer-implemented method according to claim 1, comprising, in a step preceding training the second convolutional neural network, selecting the at least one cluster comprising a threshold number or more of image regions, and selecting therefrom the at least one kernel whose kernel weight is to be used in the second convolutional neural network.

3. The computer-implemented method according to claim 1,
    wherein the training of the second convolutional neural network comprises training the second convolutional neural network with kernel weights of the kernels corresponding to the image regions of the at least one of the clusters.

4. The computer-implemented method according to claim 3, wherein the computer-implemented method comprises, in a step preceding training the second convolutional neural network, selecting the at least one cluster comprising a threshold number or more of image regions.

5. The computer-implemented method according to claim 1, comprising, in a step preceding the aggregation of the outputs, the resizing of the aggregate maps, or the clustering of the region maps:
    extracting rules associated with the kernels in the first convolutional neural network.

6. The computer-implemented method according to claim 5, wherein any steps subsequent to the extraction of the rules are limited to kernels in the first convolutional neural network which are associated with rules.

7. The computer-implemented method according to claim 1, wherein the aggregation of outputs comprises aggregating outputs corresponding to a random selection of input samples.

8. The computer-implemented method according to claim 1, wherein the aggregation of outputs comprises aggregating outputs corresponding to a number of input samples for which an activation score $a_{k,i}$ is highest, wherein $a_{k,i}$ is the activation score of kernel k for input sample i.

9. The computer-implemented method according to claim 1, wherein the aggregation of outputs comprises aggregating outputs corresponding to the input samples for which an activation score $a_{k,i}$ is above a threshold activation score, wherein $a_{k,i}$ is the activation score of kernel k for input sample i.

10. The computer-implemented method according to claim 1, wherein the aggregation of outputs comprises computing each element of the aggregate map as a normalized sum of a corresponding element of each of the outputs.

11. The computer-implemented method according to claim 1, wherein the clustering of the region maps is based on flattened representations of the region maps.

12. The computer-implemented method according to claim 1, wherein the clustering of the region maps comprises performing the clustering using a k-means clustering algorithm.

13. The computer-implemented method according to claim 1, comprising, in a step following the clustering of the region maps, labelling a plurality of the kernels by labelling at least one cluster.

14. The computer-implemented method according to claim 13, wherein training the second convolutional neural network comprises using the labels of the kernels corresponding to image regions of the at least one cluster.

15. The computer-implemented method according to claim 1, wherein training the second convolutional neural network comprises freezing kernel weights used in the second convolutional neural network and corresponding to the image regions of at least one cluster.

16. The computer-implemented method according to claim 1, wherein training the second convolutional neural network comprises allowing training of the second convolutional neural network to adjust kernel weights used in the second convolutional neural network and corresponding to the image regions of at least one cluster.

17. The computer-implemented method according to claim 1, wherein the input samples of the first domain comprise images taken by an on-board camera of at least one vehicle in a first geographical area and the input samples of the second domain comprise images taken by an on-board camera of at least one vehicle in a second geographical area.

18. The computer-implemented method according to claim 1, wherein the input samples of the first and second domains comprise medical images taken of at least one patient.

19. A computer program which, when run on a computer, causes the computer to carry out a method comprising:
    for each of a plurality of input samples of a first domain, obtaining an output from each of a plurality of kernels in an extraction layer of a first trained convolutional neural network, wherein the first convolutional neural network is configured to identify one or more features in an image;

generating a plurality of aggregate maps corresponding respectively to at least some of the kernels by, for each of the at least some of the kernels, aggregating the outputs from the kernel and corresponding to at least some of the input samples to generate an aggregate map corresponding to that kernel;

resizing the aggregate maps to a lower resolution to generate a plurality of region maps corresponding to the aggregate maps, respectively;

clustering the region maps to generate clusters of region maps, each cluster comprising region maps having similar regions; and training, using input samples of a second domain, a second convolutional neural network with a kernel weight of at least one of the kernels which corresponds to at least one of the image regions of at least one of the clusters.

20. An information processing apparatus comprising a memory and a processor connected to the memory, wherein the processor is configured to:

for each of a plurality of input samples of a first domain, obtain an output from each of a plurality of kernels in an extraction layer of a first trained convolutional neural network, wherein the first convolutional neural network is configured to identify one or more features in an image;

generate a plurality of aggregate maps corresponding respectively to at least some of the kernels by, for each of the at least some of the kernels, aggregating the outputs from the kernel and corresponding to at least some of the input samples to generate an aggregate map corresponding to that kernel;

resize the aggregate maps to a lower resolution to generate a plurality of region maps corresponding to the aggregate maps, respectively;

cluster the region maps to generate clusters of region maps, each cluster comprising region maps having similar regions; and train, using input samples of a second domain, a second convolutional neural network with a kernel weight of at least one of the kernels which corresponds to at least one of the image regions of at least one of the clusters.

* * * * *